United States Patent
Baudoin et al.

(10) Patent No.: US 9,030,938 B2
(45) Date of Patent: May 12, 2015

(54) METHODS FOR TRANSMITTING AND RECEIVING DATA BETWEEN A TERMINAL AND A GATEWAY, IN PARTICULAR VIA A SATELLITE LINK

(71) Applicants: Thales, Neuilly-sur-Seine (FR); Centre National d'Etudes Spatiales, Paris (FR)

(72) Inventors: Cedric Baudoin, Toulouse (FR); Fabrice Arnal, Cugnaux (FR)

(73) Assignees: Thales, Courbevoie (FR); Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 14/290,753

(22) Filed: May 29, 2014

(65) Prior Publication Data

US 2014/0355516 A1    Dec. 4, 2014

(30) Foreign Application Priority Data

May 31, 2013   (FR) ..................................... 13 01238

(51) Int. Cl.
| | |
|---|---|
| *H04L 12/28* | (2006.01) |
| *H04J 3/24* | (2006.01) |
| *H04J 3/18* | (2006.01) |
| *H04W 72/04* | (2009.01) |
| *H04B 7/185* | (2006.01) |
| *H04L 12/741* | (2013.01) |
| *H04L 29/06* | (2006.01) |

(52) U.S. Cl.
CPC ........ *H04W 72/0446* (2013.01); *H04B 7/18513* (2013.01); *H04L 45/54* (2013.01); *H04L 69/04* (2013.01); *H04L 69/22* (2013.01)

(58) Field of Classification Search
CPC ... H04L 29/08792; H04L 45/54; H04L 47/10; H04L 49/3009; H04L 61/6022; H04L 63/166; H04L 69/04; H04L 69/22; H04L 2209/30; G06F 2212/401; H04B 7/18513; H04W 28/06; H04W 72/0446; H04W 76/021; H03M 7/30

USPC ......... 370/229–230, 235, 392, 400–401, 409, 370/474–477

See application file for complete search history.

(56) References Cited

U.S. PATENT DOCUMENTS

| | | | | |
|---|---|---|---|---|
| 5,293,379 A | * | 3/1994 | Carr | ............................... 370/474 |
| 6,608,841 B1 | * | 8/2003 | Koodli | ........................... 370/474 |

(Continued)

FOREIGN PATENT DOCUMENTS

| | | |
|---|---|---|
| EP | 1298887 A2 | 4/2003 |
| WO | 2008038931 A1 | 4/2008 |

OTHER PUBLICATIONS

Loutfi Nuaymi, et al., "Headers Overhead Estimation, Header Supression and Header Compression", Third IEEE International Conference on Wireless and Mobile Computing, Networking and Communications, Oct. 8, 2007, 7 pages, IEEE, Piscataway, NJ, USA, XP031338300.

*Primary Examiner* — Tri H Phan
(74) *Attorney, Agent, or Firm* — Baker Hostetler LLP

(57) ABSTRACT

A method for transmitting data between a terminal and a gateway, the data being transported by Ethernet frames comprising an Ethernet header and a payload, which are themselves encapsulated in lower level packets each comprising a header containing a medium access address, comprises the following steps: determining contexts common to frames whose Ethernet headers have identical fields, and defining an identifier of each the context; associating all or some of the frames with the corresponding context identifiers and suppressing the fields from their Ethernet headers; and introducing the context identifier of each frame for which the fields of the Ethernet header have been suppressed from the header of the lower level packet encapsulating it by replacing its medium access address. A method for receiving data transmitted by means of such a method.

18 Claims, 3 Drawing Sheets

(56) References Cited

U.S. PATENT DOCUMENTS

| | | | |
|---|---|---|---|
| 6,618,397 B1 * | 9/2003 | Huang | 370/474 |
| 8,310,988 B2 * | 11/2012 | Ryu et al. | 370/328 |
| 8,406,212 B2 * | 3/2013 | Liu et al. | 370/349 |
| 2005/0271033 A1 * | 12/2005 | Nakash | 370/349 |

* cited by examiner

METHODS FOR TRANSMITTING AND RECEIVING DATA BETWEEN A TERMINAL AND A GATEWAY, IN PARTICULAR VIA A SATELLITE LINK

CROSS-REFERENCE TO RELATED APPLICATION

This application claims priority to foreign French patent application No. FR 1301238, filed on May 31, 2013, the disclosure of which is incorporated by reference in its entirety.

FIELD OF THE INVENTION

The invention relates to a method for transmitting data between a terminal (or a plurality of terminals) and a gateway, as well as to a method for receiving said data. The invention applies in particular to satellite links and even more particularly to the satellite transmission of Ethernet packets via the DVB protocol.

BACKGROUND

The Ethernet protocol was initially devised to be used in local area networks (LAN), but its success has been such that it is now used also to implement metropolitan area networks (MAN), and even wide area networks (WAN), including the use of satellite links. In the latter case, terminals communicate with one or more gateways via a satellite, by exchanging Ethernet frames encapsulated in lower level packets, for example DVB (digital video broadcast) packets.

Each Ethernet frame—and each DVB or equivalent packet—comprises a "payload" and a header, the latter notably comprising an origin address and a destination address. The payload of the DVB packet consists of the Ethernet frame, including its header. Thus, each network layer adds a header to the data that is exchanged, which creates an overhead.

Because of their large size, the Ethernet headers generate a significant overhead, leading to a strong degradation of the capacity for level 2 interconnect solutions, notably used for virtual private networks (VPN), collection or backhauling networks and numerous wired or wireless standards. This overhead constitutes a brake to the deployment of native Ethernet transport solutions in satellite networks.

Methods for suppressing the headers are known; one example that can be cited is the "PHS" (payload header suppression) method. This method comprises the following steps: first of all, the "context" of a packet, or frame, which has to be transmitted is identified, that is to say a set of information making it possible to define a flow to which said packet belongs. This context univocally determines certain fields of the header of the packet (origin address, destination address, packet length, etc.), called "static" because they are common to a large number of packets exchanged (all those which relate to one and the same flow); then, an identifier is associated on a one-to-one basis with each so-called context (PHSI: "PHS identifier"). Then, the "static" fields of the header are suppressed, and replaced by just the context identifier. Thus, the header is completely or partly suppressed before transmission, and replaced by a more compact identifier, which results in a great reduction in the overhead.

On the reception side, the suppressed fields of the header are reconstructed from the context identifier. However, in the case of a terminal-gateway link, and even more particularly when such a link forms part of a satellite system, the number of flows—and therefore of different contexts—is very high. This means that the context identifiers must include a minimum number of bytes (generally 3 bytes, making it possible to identify more than 16 million flows), which limits the gain of efficiency which can be obtained. Consider for example the case of a voice packet having a payload of 20 bytes and a DVB header of three bytes; the overhead of three additional bytes introduced by the context identifier represents 13% of the bit rate.

There are also header compression techniques, based on a differential coding (for example ROHC, which stands for "Robust Header Compression". These techniques are more sophisticated than simple header suppression by notably making it possible to compress certain dynamic fields; however, they have been developed only for level 3 stacks (network layer, for example IP) or higher, and do not therefore include compression of the Ethernet headers.

SUMMARY OF THE INVENTION

The invention aims to overcome the abovementioned drawbacks of the prior art and make it possible to reduce the overhead created by the headers in the transmission of Ethernet frames between a terminal and a gateway, in particular via a satellite link.

To achieve this aim, the invention starts from the following observation. In a terminal-gateway link, the medium access address (SVN-MAC, for example, in DVB-RCS2, GSE label in DVB-S2, LogonId/GroupId in DVB-RCS) contained in the lower level packet header is redundant with the context of the Ethernet flow. In other words, the context identifier (PHSI) which wholly or partly replaces the Ethernet header and the medium access address in the lower level header convey the same information. It is therefore possible to replace said medium access address by the PHSI, and use the latter to implement the filtering of the flows. In this way, the PHSI is not added to the header of the lower level packet, but replaces one of its fields; consequently, it does not create any overhead.

This solution can be coupled with the use of a method for suppression or—better—compressing the headers of the layers above Ethernet (notably IP). The two methods are implemented independently.

An additional bit rate saving can be obtained by suppressing frame control sequences (FCS). This is enabled by the very low bit error ratios of the satellite links, of the order of $10^{-10}$. The FCS is recalculated at the receiver, which does not add to the processing, because checking the sequence is equivalent to calculating it from the computation load point of view.

One subject of the invention is therefore a method for transmitting data between a terminal and a gateway, the data being transported by Ethernet frames comprising an Ethernet header and a payload, which are themselves encapsulated in lower level packets each comprising a header containing a medium access address indication, the method being characterized in that it comprises the following steps:

a) determining contexts common to frames whose Ethernet headers have static fields, and defining an identifier of each said context;

b) associating all or some of said frames with the corresponding context identifiers and suppressing said static fields from their Ethernet headers; and c) introducing the context identifier of each frame for which said fields of the Ethernet header have been suppressed into the header of the lower level packet encapsulating it in replacement of its medium access address indication.

According to other advantageous features of the invention, taken separately or in combination:

the method may also comprise the following step:

d) suppressing frame control information from said Ethernet frames.

The transmission of said packets between said terminal and said gateway can be implemented by means of a satellite link.

Said packets can be transmitted from a gateway to a terminal and said lower level packets can be GSE packets.

Said packets can be transmitted from a terminal to a gateway and said lower level packets can be RLE packets.

The medium access address indications of the headers of said lower level packets can be DVB addresses.

Said step a) for determining contexts and defining identifiers can be performed by statically creating a plurality of connections between terminals and said or one said gateway, each connection corresponding to one said context.

During said step a), said contexts can be determined, and the corresponding identifiers are defined, on the fly, by said or each gateway and communicated to one or more said terminals.

The method may also comprise a step of filtering the flows by means of the context identifiers contained in the headers of said lower level packets.

Another subject of the invention is a method for receiving data transmitted between a terminal and a gateway, comprising the following steps:

i) receiving data packets each comprising a header and a payload, said payload containing an Ethernet frame in which at least some fields of the Ethernet header have been suppressed;

ii) extracting a context identifier from a medium access address indication field of the header of at least one said packet; and iii) from said identifier, reconstructing the fields of the Ethernet header of said frame which had been suppressed.

According to other advantageous features of the invention, taken separately or in combination:

Said Ethernet frame may not include frame control information, the method also comprising the following step:

iv) recalculating the frame control information of said Ethernet frame from its payload and from its reconstructed header, and reintroducing this information into said frame.

The transmission of said packets between said terminal and said gateway may be performed by means of a satellite link.

Said packets may be transmitted from a gateway to a terminal and said lower level packets may be GSE packets.

Said packets may be transmitted from a terminal to a gateway and said lower level packets may be RLE packets.

The medium access address indications of the headers of said lower level packets may be DVB addresses.

The method may comprise a step of constructing a database associating one or more fields of an Ethernet header with each context identifier, said database being used for the implementation of said step iii).

Said step of constructing a database may be performed by statically creating a plurality of connections between terminals and said or one said gateway, each connection corresponding to one said context.

As a variant, during said step of constructing a database, the gateway may identify each new context, determine one or more fields of the Ethernet header associated with said context and communicate them to a terminal with a corresponding context identifier.

BRIEF DESCRIPTION OF THE DRAWINGS

Other features, details and advantages of the invention will emerge on reading the description, given with reference to the attached drawings, given by way of example and which represent, respectively.

DETAILED DESCRIPTION

Figure 1:
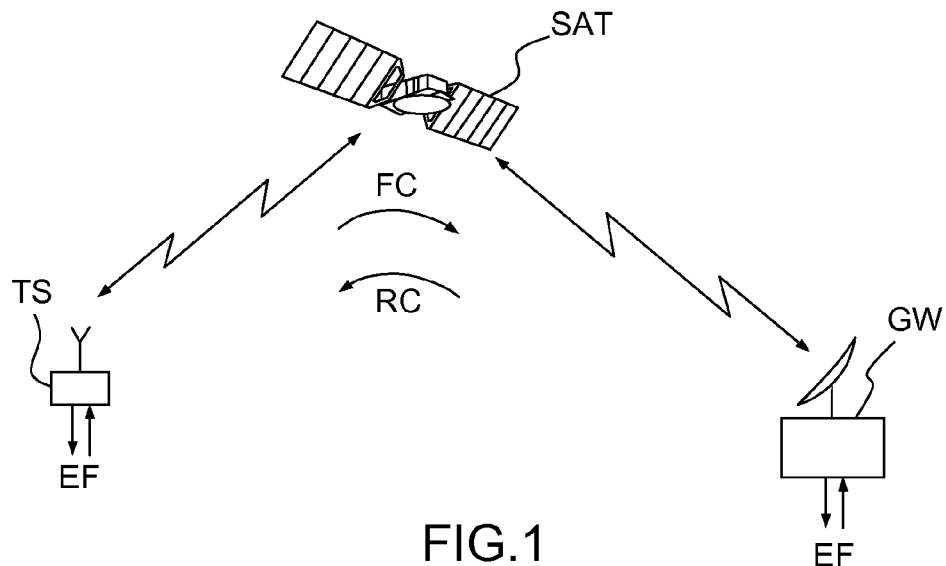
FIG. 1, a satellite communication system suitable for implementing the methods of the invention.

FIG. 1 very schematically illustrates a satellite communication system in which the present invention can be implemented. This system comprises a plurality of terminals TS (just one is represented) which communicate with gateways GW via a satellite SAT. The communication is made by exchanging Ethernet frames EF which are encapsulated in DVB packets before transmission, and which are extracted therefrom after reception. The communication is two-way; the gateway-terminal link is called "forward channel" FC and the terminal-gateway link is called "return channel" RC. These two links can use different encapsulation and transmission protocols, for example GSE for the forward channel and RLE for the return channel. The invention makes it possible to increase the payload of the system by reducing the overhead introduced by the Ethernet headers, and does so both on the forward channel and on the return channel.

Figure 2A:
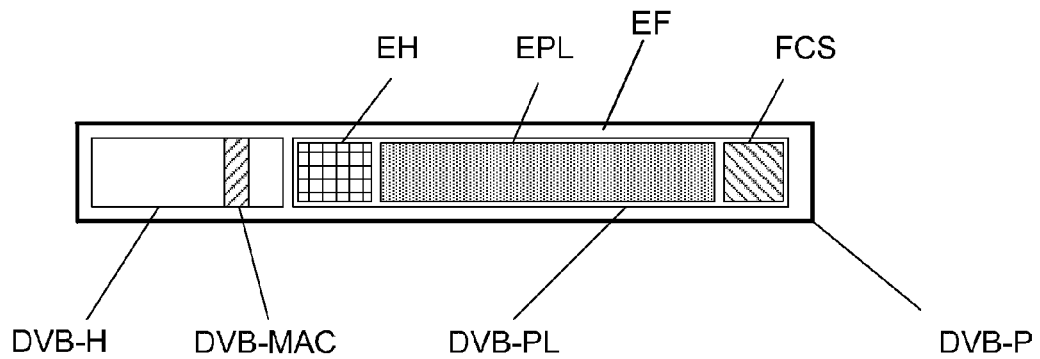
FIG. 2A, a DVB packet encapsulating a conventional Ethernet frame in accordance with the prior art.

The structure of a conventional DVB packet is illustrated in FIG. 2A under the reference DVB-P. Such a packet contains a header DVB-H and a payload DVB-PL. The header DVB-H contains, among other things, a medium access address DVB-MAC. The payload DVB-PL consists of an Ethernet frame EF, which in turn comprises an Ethernet header EH, an Ethernet payload EPL and a frame control sequence FCS. The Ethernet header EH contains, and may even consist solely of, so-called "static" fields which are identical in all the frames of one and the same flow; these are notably the origin and destination addresses.

In these conditions, in accordance with the PHS method, the static fields of the Ethernet headers EH can be replaced by a context identifier PHSI, comprising a smaller number of bytes; for example, with a PHSI length of 3 bytes, it is possible to manage more than 16 million different contexts, and therefore flows.

In accordance with the invention, however, the context identifier PHSI does not occupy the place of the static fields that it replaces, but that of MAC address indications (DVB) contained in the header DVB-H of the packet DVB-P. In fact, as explained above, in the case of a communication between a terminal and a gateway, the information conveyed in the MAC address of the DVB header is redundant with the static fields of the header of the Ethernet frame. This MAC address indication (DVB), redundant with the context identifier PHSI, is therefore no longer transported directly, with no effect on the rest of the processing operations. In particular, the filtering of the flows can be done on the basis of the context identifiers PHSI with no particular difficulty.

Figure 2B:
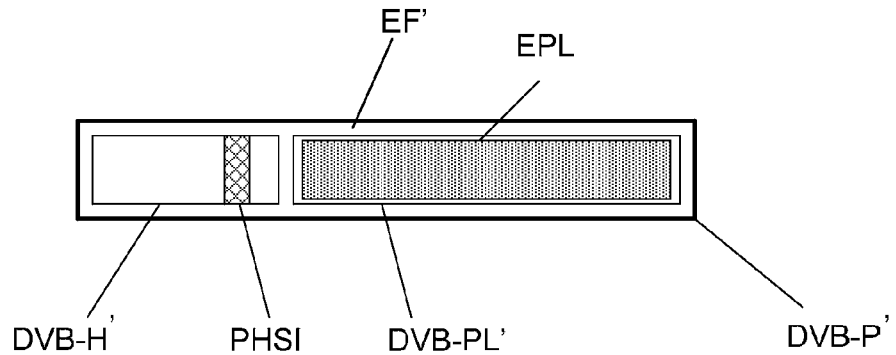
FIG. 2B, a DVB packet modified in accordance with one embodiment of the invention.
Figure 2C:
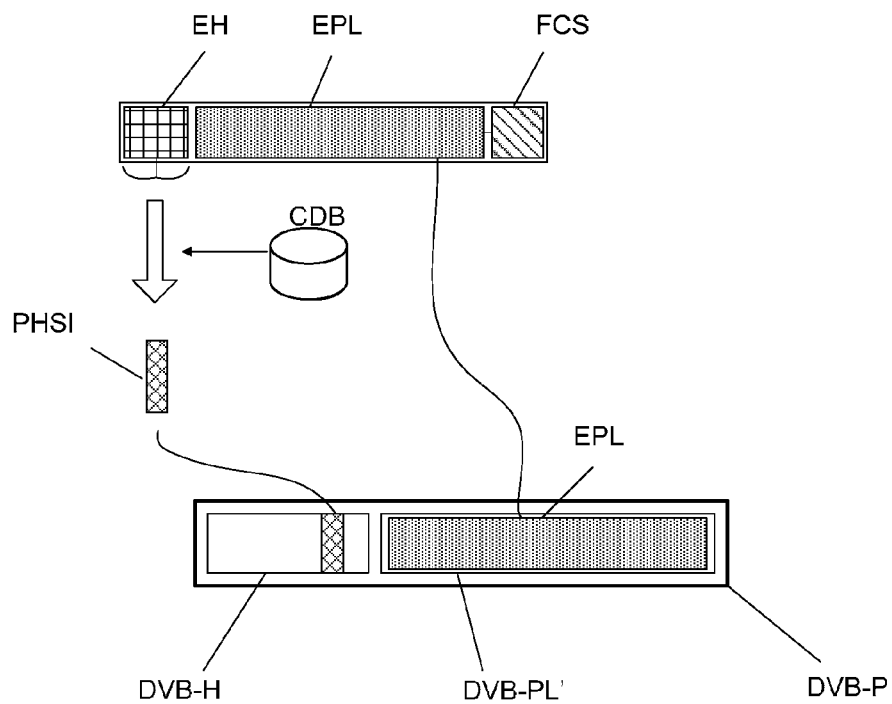
FIG. 2C, the implementation of a header suppression step according to one embodiment of the invention.

In the embodiment of FIGS. 2A-2C, the Ethernet header contains only static fields; consequently, it can be entirely suppressed. Moreover, as mentioned above, the frame control sequence FCS can also be suppressed upon transmission to be reconstructed on reception from the payload and from the reconstructed Ethernet header EH. There is thus obtained, as illustrated by FIG. 2B, a modified DVB packet DVB-P' whose header DVB-H' does not contain any MAC address, but a context identifier PHSI, and whose payload DVBPL' contains a modified Ethernet frame EF' without header and without control sequence FCS, therefore coinciding in practice with its payload EPL (in other embodiments, a reduced header containing only non-static fields could remain). This modified DVB packet is transmitted by the system of FIG. 1, the context identifier PHSI being used, at the terminations (TS and/or GW) for the filtering of the flows in place of the MAC address.

FIG. 2C illustrates the step of suppression of the Ethernet header (and of the FCS sequence) and its replacement by a PHSI field inserted into the DVB header. This step uses a database CDB which associates the corresponding context identifier with each Ethernet header (or with each set of static fields of such a header).

Figure 3:
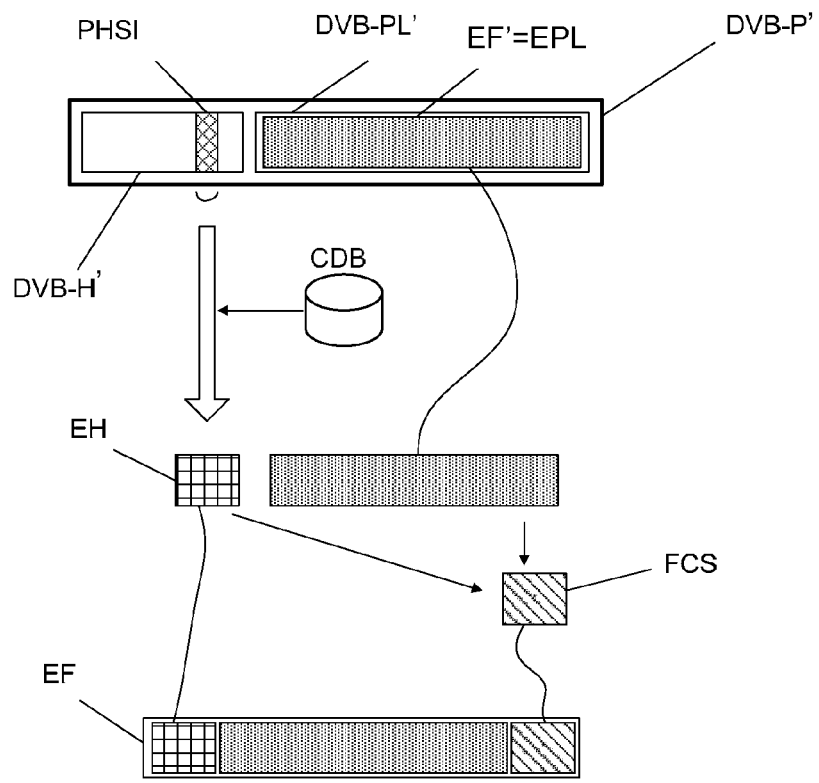
FIG. 3, the implementation of a header reconstruction step according to one embodiment of the invention.

On the reception side, the Ethernet frame is reconstructed, as illustrated in FIG. 3. The context identifier is extracted from the header DVBH' of the modified DVB packet DVB-P' and used to interrogate said database CDB, used this time to associate, with each context, the corresponding Ethernet header, which is introduced at the start of the modified Ethernet frame EF'. Furthermore, the control sequence FCS is recalculated from the Ethernet payload EPL and from the reconstructed header EH, and introduced at the end of the modified frame EF' to reconstruct the original Ethernet frame EF, which can be routed over a terrestrial network.

There are primarily two ways of constructing the database CDB.

According to a first embodiment of the invention, it is constructed statically: during parameterization "by management" of the terminals, a plurality of connections are created, each corresponding to a respective context. The set of contexts managed by the system is then defined in advance.

Figure 4:
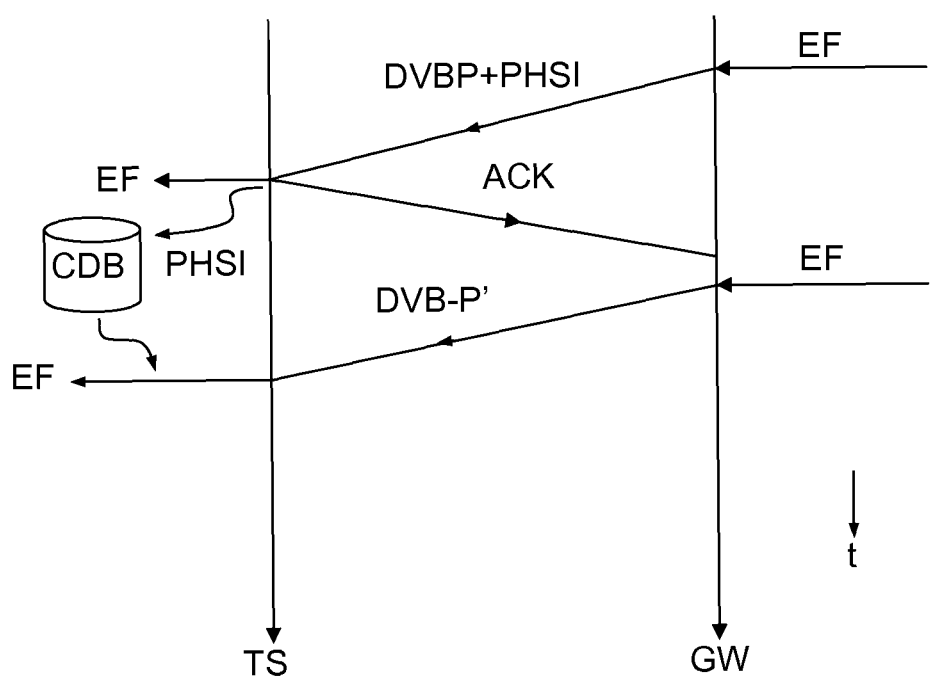
FIG. 4, the negotiation between a gateway and a terminal to identify a context "on the fly" and define the corresponding identifier.

A different approach, used in other embodiments of the invention, is based on dynamic configuration. Several methods can be used for this purpose, either based on dynamic VLAN (virtual private area network) creation protocols, or based on connection creation access protocols (C2P type), or, finally, by establishing on-the-fly header suppression contexts (PHSI and static Ethernet fields). In this context, the VLANs can be configured dynamically or not. It is then appropriate to determine the context and the associated PHSI and send it to the other end of the satellite link via a specific protocol, similar to the case of WiMAX with PHS. The choice of PHSI can be made centrally in a network control centre (NCC). One possible embodiment is illustrated in FIG. 4. The first Ethernet frame EF of a flow is transmitted in its entirety, encapsulated in a DVB-P packet, and the identifier PHSI of its context is also transmitted via a specific GSE or RLE extension, as mentioned above, which makes it possible to construct the database CDB at the receiver. The latter sends an acknowledgement message ACK (also defined in the context of the GSE or RLE extension concerned) to assure the header suppression module of the transmitter that the context identifier can be used for the flow corresponding to the frame EF. Then, the Ethernet headers of the frames relating to the same context are suppressed, and the transmission is carried out by means of packets DVB-P' as described above.

The DVB frames make it possible to convey several types of lower level protocols; for this reason, the RLE and GSE protocols provide a "protocol_type" field making it possible to identify the transport mode. This field can be used to distinguish the packets encapsulating "conventional" Ethernet frames or with header suppressed. This notably makes it possible to mix both types of flow.

FIG. 4 relates to the particular case of a transmission over the forward channel, the downward-pointing arrow "t" indicates the time direction.

The table below makes it possible to appreciate the technical advantage obtained by the invention. The case considered is that in which the header suppression (with 3-byte context identifiers) is coupled with a header compression of ROHC type. Depending on the protocol concerned, the overhead saving linked to the suppression of the Ethernet header with 802.1Q tag can be as high as 73%.

|  | RTP/UDP/ IPv4/ Ethernet | RTP/UDP/ Ipv6/ Ethernet | RTP/UDP/ IPv4/ ROHC/ Ethernet | RTP/UDP/ IPv6/ ROHC/ Ethernet |
| --- | --- | --- | --- | --- |
| Size before header suppression | 82 bytes | 106 bytes | 44 bytes | 46 bytes |
| Size after header suppression | 60 bytes | 84 bytes | 22 bytes | 24 bytes |
| Compression gain | 27% | 21% | 50% | 48% |

The invention has been described in relation to the particular case of a satellite communication system based on a protocol of DVB type. However, this is not an essential limitation, and other satellite, or even terrestrial, communication systems can benefit from the Ethernet header suppression method described above.

The invention claimed is:

1. A method for transmitting data between a terminal and a gateway, the data being transported by Ethernet frames comprising an Ethernet header and a payload, which are encapsulated in lower level packets each comprising a header containing a medium access address indication, the method comprising the following steps:
   a) determining contexts common to frames whose Ethernet headers have static fields, and defining an identifier of each said context;
   b) associating all or some of said frames with the corresponding context identifiers and suppressing said static fields from their Ethernet headers; and
   c) introducing the context identifier of each frame for which said fields of the Ethernet header have been suppressed into the header of the lower level packet encapsulating it in replacement of its medium access address indication.

2. The method according to claim 1, further comprising the following step:
   d) suppressing frame control information from said Ethernet frames.

3. The method according to claim 1, comprising the transmission of said packets between said terminal and said gateway by means of a satellite link.

4. The method according to claim 1, wherein said packets are transmitted from a gateway to a terminal and said lower level packets are GSE packets.

5. The method according to claim 1, wherein said packets are transmitted from a terminal to a gateway and said lower level packets are RLE packets.

6. The method according to claim 1, wherein the medium access address indications of the headers of said lower level packets are DVB addresses.

7. The method according to claim 1, wherein said step a) for determining contexts and defining identifiers is performed by statically creating a plurality of connections between terminals and said or one said gateway, each connection corresponding to one said context.

8. The method according to claim 1, wherein, during said step a), said contexts are determined, and the corresponding identifiers are defined, on the fly, by said or each gateway and communicated to one or more said terminals.

9. The method according to claim 1, also comprising a step of filtering the flows by means of the context identifiers contained in the headers of said lower level packets.

10. The method for receiving data transmitted between a terminal and a gateway, comprising the following steps:
   i) receiving data packets each comprising a header and a payload, said payload containing an Ethernet frame in which at least some fields of the Ethernet header have been suppressed;
   ii) extracting a context identifier from a medium access address indication field of the header of at least one said packet; and
   iii) from said identifier, reconstructing the fields of the Ethernet header of said frame which had been suppressed.

11. The method according to claim 10, wherein said Ethernet frame does not include frame control information, the method further comprising the following step:
   iv) recalculating the frame control information of said Ethernet frame from its payload and from its reconstructed header, and reintroducing this information into said frame.

12. The method according to claim 10, wherein the transmission of said packets between said terminal and said gateway is performed by means of a satellite link.

13. The method according to claim 10, wherein said packets are transmitted from a gateway to a terminal and said lower level packets are GSE packets.

14. The method according to claim 10, wherein said packets are transmitted from a terminal to a gateway and said lower level packets are RLE packets.

15. The method according to claim 10, wherein the medium access address indications of the headers of said lower level packets are DVB addresses.

16. The method according to claim 10, comprising a step of constructing a database associating one or more fields of an Ethernet header with each context identifier, said database being used for the implementation of said step iii).

17. The method according to claim 16, wherein said step of constructing a database is performed by statically creating a plurality of connections between terminals and said or one said gateway, each connection corresponding to one said context.

18. The method according to claim 16, in which, during said step of constructing a database, the gateway identifies each new context, determines one or more fields of the Ethernet header associated with said context and communicates them to a terminal with a corresponding context identifier.

* * * * *